US007496591B2

(12) United States Patent
Mets et al.

(10) Patent No.: US 7,496,591 B2
(45) Date of Patent: Feb. 24, 2009

(54) METHOD AND SYSTEM FOR CAPTURING, STORING AND RETRIEVING EVENTS AND ACTIVITIES

(75) Inventors: Christiaan M. H. Mets, Chandler, AZ (US); Ila K. Montalvo Roel, Glendale, AZ (US); James A. Strilich, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1091 days.

(21) Appl. No.: 10/026,144

(22) Filed: Dec. 21, 2001

(65) Prior Publication Data

US 2003/0120461 A1 Jun. 26, 2003

(51) Int. Cl.
G06F 7/00 (2006.01)
(52) U.S. Cl. ...................................... 707/102; 707/100
(58) Field of Classification Search ........................ None
See application file for complete search history.

(56) References Cited

U.S. PATENT DOCUMENTS

| | | | | |
|---|---|---|---|---|
| 4,130,867 | A | 12/1978 | Bachman et al. | 707/1 |
| 5,006,992 | A | 4/1991 | Skeirik | |
| 5,325,522 | A | 6/1994 | Vaughn | |
| 5,561,796 | A | 10/1996 | Sakamoto et al. | 707/3 |
| 5,590,325 | A | 12/1996 | Kolton et al. | 707/3 |
| 5,603,024 | A | 2/1997 | Goldring | 707/203 |
| 5,613,113 | A * | 3/1997 | Goldring | 707/202 |
| 5,648,900 | A | 7/1997 | Bowen et al. | 707/5 |
| 5,732,401 | A | 3/1998 | Conway | 705/29 |
| 5,848,395 | A | 12/1998 | Edgar et al. | 705/9 |
| 5,856,931 | A | 1/1999 | McCasland | 702/182 |

(Continued)

FOREIGN PATENT DOCUMENTS

EP  0 472 736 A1  3/1992

(Continued)

OTHER PUBLICATIONS

International Search Report, dated Apr. 28, 2003, relative to PCT application No. PCT/US 02/41467, the foreign equivalent to the instant U.S. Appl. No. 10/026,144, 4 pages.

*Primary Examiner*—Apu M Mofiz
*Assistant Examiner*—Kavita Padmanabhan
(74) *Attorney, Agent, or Firm*—Ohlandt, Greeley, Ruggiero & Perle, LLP (57) ABSTRACT

A method and system for processing the data of any one of a variety of processes without doing a total custom design for each process. The system includes a computer and database that communicates with various monitors of the process to gather, store and retrieve the process data. A user interfaces to the computer via a client device. The computer includes a program that identifies events and activities of the process based on input from the user or from process data collected as the process runs. Attributes of the events and activities are also identified. These events, activities and attributes are classified according to a data structure that includes event types, activity types and attribute types. Storage volumes are allocated to each of the defined event types and/or activity types for storage and retrieval of the data by attribute type. The composite event or activity data can be retrieved in multiple views, such as row, column, graphical and the like.

26 Claims, 12 Drawing Sheets

U.S. PATENT DOCUMENTS

| | | | |
|---|---|---|---|
| 5,890,134 A | 3/1999 | Fox | 705/9 |
| 5,909,672 A | 6/1999 | Madore et al. | 705/32 |
| 5,939,974 A | 8/1999 | Heagle et al. | 340/286.09 |
| 5,974,457 A | 10/1999 | Wacawsky et al. | 709/224 |
| 6,073,110 A | 6/2000 | Rhodes et al. | 705/8 |
| 6,341,283 B1 | 1/2002 | Yamakawa et al. | 707/101 |
| 6,480,830 B1 | 11/2002 | Ford et al. | 705/9 |
| 6,526,405 B1 | 2/2003 | Mannila et al. | 707/6 |
| 6,590,507 B2 | 7/2003 | Burns | 340/995.13 |
| 6,606,606 B2 | 8/2003 | Starr | 705/35 |
| 6,622,116 B2 | 9/2003 | Skinner et al. | 702/183 |
| 6,625,567 B1 | 9/2003 | McMahan | 702/179 |
| 6,633,823 B2 | 10/2003 | Bartone et al. | 702/57 |
| 6,647,370 B1 | 11/2003 | Fu et al. | 705/8 |
| 2002/0107841 A1 | 8/2002 | Hellerstein et al. | 707/3 |
| 2002/0133490 A1 | 9/2002 | Conkwright et al. | 707/9 |
| 2002/0165733 A1 | 11/2002 | Pulkkinen et al. | 705/2 |
| 2003/0014498 A1 | 1/2003 | Kreedler et al. | 709/217 |

FOREIGN PATENT DOCUMENTS

| | | |
|---|---|---|
| EP | 0 592 921 | 10/1993 |
| EP | 0 621 522 A2 | 10/1994 |
| EP | 0 740 241 | 10/1996 |
| WO | WO 01/73666 | 10/2001 |
| WO | WO 01/73666 A1 | 10/2001 |

\* cited by examiner

| Activity Type | Attribute Name | Static | Default Value |
|---|---|---|---|
| UnitOperation | StartTime | N | |
| | EndTime | N | |
| | ID | N | |
| | Equipment | N | |
| | FlowRate | N | |
| | AccumValue | Y | |
| | Source | Y | ProdSystem |

| Event Type | Attribute Name | Static | Default Value |
|---|---|---|---|
| Alarm | TimeStamp | N | |
| | Resource | N | |
| | Message | N | |
| | State | N | |
| | Source | Y | OprSystem |
| OprChg | TimeStamp | N | |
| | Operator | N | |
| | Resource | N | |
| | Message | N | |
| | Command | N | |
| | Source | N | |

Fig. 6

History (86)

| Activity Type | Start Time | End Time | ID | Equipment | FlowRate | AccumValue |
|---|---|---|---|---|---|---|
| PumpOut | 8/17/2000 10:00AM | 8/17/2000 10:55AM | PumpOut1 | Tank1 | FI1001.PV | 150,000 |
| PumpOut | 8/17/2000 11:05AM | 8/17/2000 11:45AM | PumpOut2 | Tank2 | FI1001.PV | 65,000 |
| PumpOut | 8/17/2000 12:05PM | 8/17/2000 2:05PM | PumpOut3 | Tank2 | FI1002.PV | 85,000 |

| Event Type | Time Stamp | Resource | Message | State | Source |
|---|---|---|---|---|---|
| Alarm | 8/17/2000 11:35AM | T101 | LowTemp | On | OprSystem |
| Alarm | 8/17/2000 11:40AM | P101 | PumpFail | On | OprSystem |
| Alarm | 8/17/2000 11:45AM | P101 | PumpFail | Off | OprSystem |

| Event Type | Time Stamp | Operator | Resource | Message | Command | Source |
|---|---|---|---|---|---|---|
| OprChg | 8/17/2000 10:20AM | JOE | P101 | Speed | 50 | OprSystem |

| Event Type | Time Stamp | Operator | Device | Message | Command | Source |
|---|---|---|---|---|---|---|
| OprChg | 8/17/2000 11:35AM | FRED | P101 | RedTag | OutOfService | MaintSystem |
| OprChg | 8/17/2000 1:35PM | FRED | P101 | RedTag | InService | MaintSystem |

Fig. 7

Instance

Pump Out Activities

| Start Time | End Time | ID | Equipment | FlowRate | AccumValue | Source |
|---|---|---|---|---|---|---|
| 8/17/2000 10:00AM | 8/17/2000 10:55AM | PumpOut1 | Tank1 | FI1001.PV | 150,000 | ProdSystem |
| 8/17/2000 11:05AM | 8/17/2000 11:45AM | PumpOut2 | Tank2 | FI1001.PV | 65,000 | ProdSystem |
| 8/17/2000 12:05PM | 8/17/2000 2:05PM | PumpOut3 | Tank2 | FI1002.PV | 85,000 | ProdSystem |

Alarm Events

| Time Stamp | Resource | Message | State | Source |
|---|---|---|---|---|
| 8/17/2000 11:35AM | T101 | LowTemp | On | OprSystem |
| 8/17/2000 11:40AM | P101 | PumpFail | On | OprSystem |
| 8/17/2000 11:45AM | P101 | PumpFail | Off | OprSystem |

OprChg Events

| Time Stamp | Operator | Resource | Message | Command | Source |
|---|---|---|---|---|---|
| 8/17/2000 10:20AM | JOE | P101 | Speed | 50 | OprSystem |
| 8/17/2000 11:35AM | FRED | P101 | RedTag | OutOfService | MaintSystem |
| 8/17/2000 1:35PM | FRED | P101 | RedTag | InService | MaintSystem |

Fig. 8

Retreival

Rows

| Event Type | Time Stamp | Attribute Name | Attribute Value |
|---|---|---|---|
| | | Resource | T101 |
| Alarm | 8/17/2000 11.35AM | Message | LowTemp |
| | | State | On |
| | | Source | OprSystem |
| | | Resource | P101 |
| Alarm | 8/17/2000 11.40AM | Message | PumpFail |
| | | State | On |
| | | Source | OprSystem |
| | | Resource | P101 |
| Alarm | 8/17/2000 11.45AM | Message | PumpFail |
| | | State | Off |
| | | Source | OprSystem |
| | | Operator | JOE |
| | | Resource | P101 |
| OprChg | 8/17/2000 10:20AM | Message | Speed |
| | | Command | 50 |
| | | Source | OprSystem |
| | | Operator | FRED |
| | | Resource | PMP101 |
| OprChg | 8/17/2000 10:35AM | Message | RedTag |
| | | Command | OutOfService |
| | | Source | MaintSystem |
| | | Operator | FRED |
| | | Resource | PMP101 |
| OprChg | 8/17/2000 1:35PM | Message | RedTag |
| | | Command | InService |
| | | Source | MaintSystem |

Fig. 9

Columns

| Event Type | Time Stamp | Operator | Resource | Message | Command | State |
|---|---|---|---|---|---|---|
| Alarm | 8/17/2000 11:35AM | | T101 | LowTemp | | On |
| Alarm | 8/17/2000 11:40AM | | P101 | PumpFail | | On |
| Alarm | 8/17/2000 11:45AM | | P101 | PumpFail | | Off |
| OprChg | 8/17/2000 10:20AM | JOE | P101 | Speed | 50 | |
| OprChg | 8/17/2000 10:35AM | FRED | PMP101 | RedTag | OutOfService | |
| OprChg | 8/17/2000 11:35AM | FRED | PMP101 | RedTag | InService | |

Fig. 10

Chart

| Activity Type | End Time | ID | AccumValue |
|---|---|---|---|
| PumpOut | 8/17/2000 10:55AM | PumpOut1 | 150,000 |
| PumpOut | 8/17/2000 11:45AM | PumpOut2 | 65,000 |
| PumpOut | 8/17/2000 2:05PM | PumpOut3 | 85,000 |

METHOD AND SYSTEM FOR CAPTURING, STORING AND RETRIEVING EVENTS AND ACTIVITIES

FIELD OF THE INVENTION

This invention relates to a method and apparatus for processing event and activity data of a process. In particular, the method and apparatus of the present invention is concerned with processing event and activity data of any type and number of systems.

BACKGROUND OF THE INVENTION

A process takes place over a period of time. During the process various events and activities occur and various parameters vary in value. There is a need to monitor a process in order to analyze its performance or of any parameters thereof, whether the process is an industrial one for the handling, treatment or flow of material or other process, such as the tracking of the weather or of commodities or other financial instruments and the like.

An event is something that happens at a specific point in time, e.g., an alarm becoming active, an operator message being confirmed, a parameter download, recordation of a lab measurement, and the like. An activity is something that happens over a period of time, e.g., a movement of material, a batch, a phase inside a batch, an alarm being in an active state, and the like. An activity has a time span, interval or period. In contrast, an event occurs at a specific point in time.

In the operational environment of a process, large quantities of historical data can be generated by different data sources. Capturing, storing and making this data available to applications for viewing, analysis and reporting is a challenge. Prior solutions for event and activity data are partial at best. For event and activity data, this problem has mostly been addressed on a system (data source) by system basis, each system supporting a well defined, limited set of event and activity types.

Capturing event and activity data is a challenge because the data that needs to be captured for each event and/or activity depends on the event and activity type. For each event and activity type, a different set of (attribute) values may have to be recorded. Another challenge is the fact that the data can come from any number of data sources. Storing the data is a challenge because each data source tends to come with its own solution for historizing the data, which makes the administration task of archiving, recovering and distributing the data very difficult.

Making the data available is a challenge because of the multitude of event and activity types that need to be handled and the need to be able to handle new event and activity types by simple configuration, without requiring a new release of the product. Traditionally, different visualization tools have been used for limited, well defined sets of events. The challenge is to combine all this data into a single stream that can be displayed in a single view.

Thus, there is a need for a flexible and efficient method and system for processing event and activity data of any type and any number of systems.

SUMMARY OF THE INVENTION

The method of the present invention processes data of a process in a manner that can be used for a variety of different processes without a custom design effort for each process. The method identifies one or more events and/or one or more activities of the process. The method also identifies one or more attributes of each event and/or activity. A generic data structure is used to classify the events, activities and attributes. The data structure comprises an event and/or activity type and a plurality of attribute types. The classification procedure provides defined event and/or activity types for the events and activities and defined attribute types for the attributes. One or more storage volumes are allocated to each of the defined event and/or activity types for storage and retrieval of the process data by attribute type.

According to one aspect of the invention, at least one storage volume is allocated to each of the defined attribute types. According to another aspect of the invention, the data structure further comprises a time stamp. The at least one storage volume is accessed according to the time stamp of an event for storage and retrieval of the data of the attributes thereof.

According to another aspect of the invention, the attributes of a plurality of the events and/or activities are common to one of the defined attribute types. One storage volume is allocated to all of the common attributes.

According to another aspect of the invention, the data storage in a storage volume is compressed according to the identity of the values of common attributes of consecutive events and/or activities. According to another aspect of the invention, the data structure further comprises a time stamp. The storage volume is accessed according to the time stamp for storage and retrieval of the values. The values of a first event are retrieved from the storage volume by using the value of a first time stamp for the first event or of a second time stamp value of a second one of the events that is earlier in time than the first time stamp value.

According to another aspect of the invention, for the case where the values of the attributes of a first defined attribute type are static, the data storage is compressed by omitting storage of a static value in the attribute volume.

According to another aspect of the invention, the same generic data structure is used for the definition of event types, activity types and attribute types of each of a plurality of processes, where some processes are different than others.

According to still another aspect of the invention, the data values of events and/or activities that are defined as different event and/or activity types are presented in a single view in any one of a plurality of formats. These formats can be selected from the group consisting of: row format, column format and chart format.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
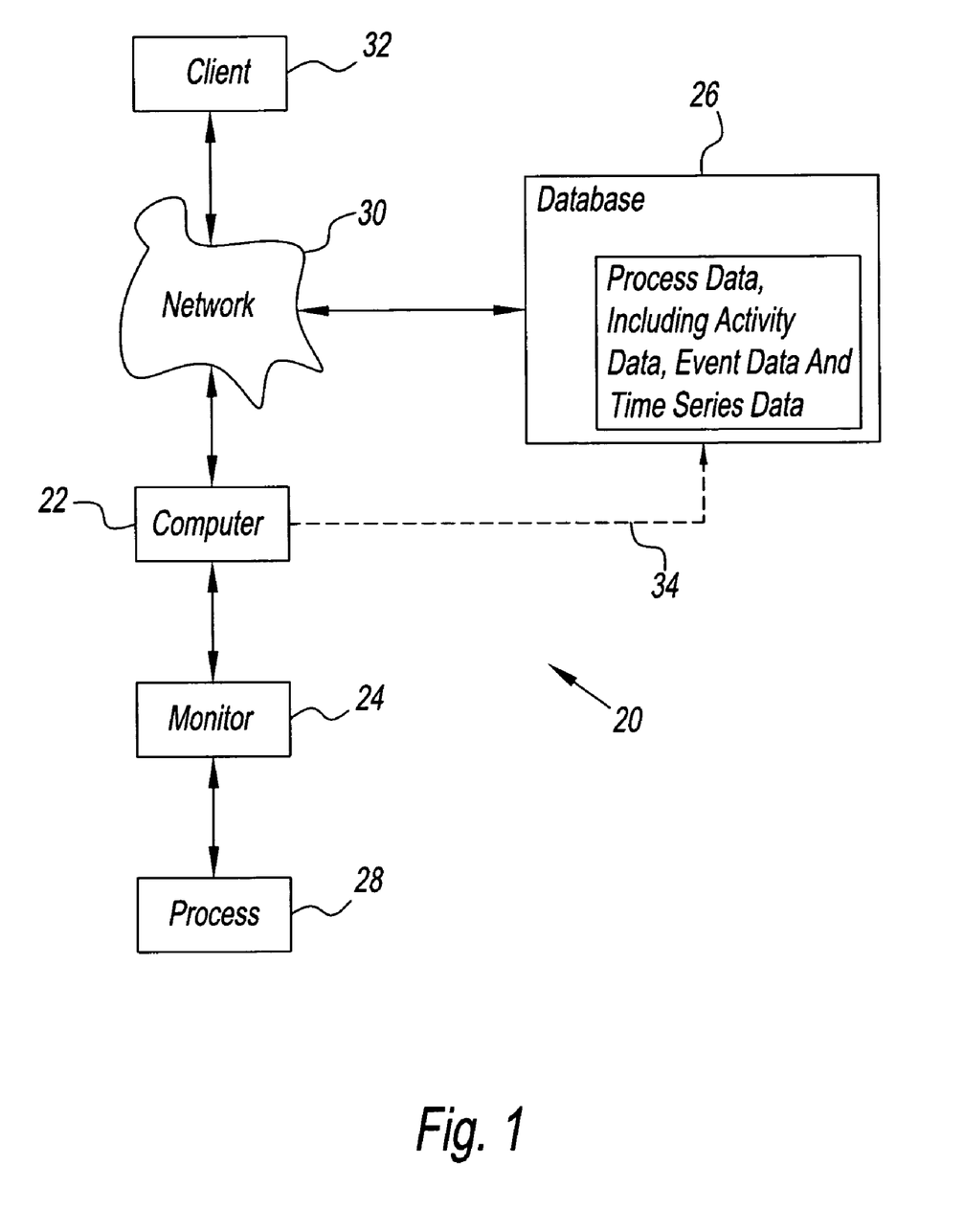
FIG. 1 is a block diagram of a system of the present invention for processing time series data.

Referring to FIG. 1, a system 20 of the present invention includes a computer 22, a monitor 24 and a database 24. A network 30 interconnects computer 22 and database 26 as well as a client device 32. Monitor 24 monitors a process 28 and provides process data to computer 22. Computer 22 processes the data and stores the data in a memory, such as database 26. Computer 22 may communicate with database 26 via network 30 or directly, as shown by the dashed line 34.

Database 26 may be a part of the memory of computer 22 or a separate database, as shown in FIG. 1. Computer 22 may be a single computer or a plurality of computers interconnected via network 30. Network 30 may be any suitable wired or wireless communication network and may include the Internet an Intranet, the public telephone system and the like.

Client device 32 may be any suitable computer entry device with a capability to communicate with computer 22 via network 30. For example, if network 30 is the Internet, client device 32 has a browser capability for Internet communications. As such, client device 32 may be a personal computer (PC), a workstation, a phone or other suitable device. Similarly, computer 22 would be equipped with Internet capability to serve files and/or otherwise communicate via the Internet.

Figure 2:
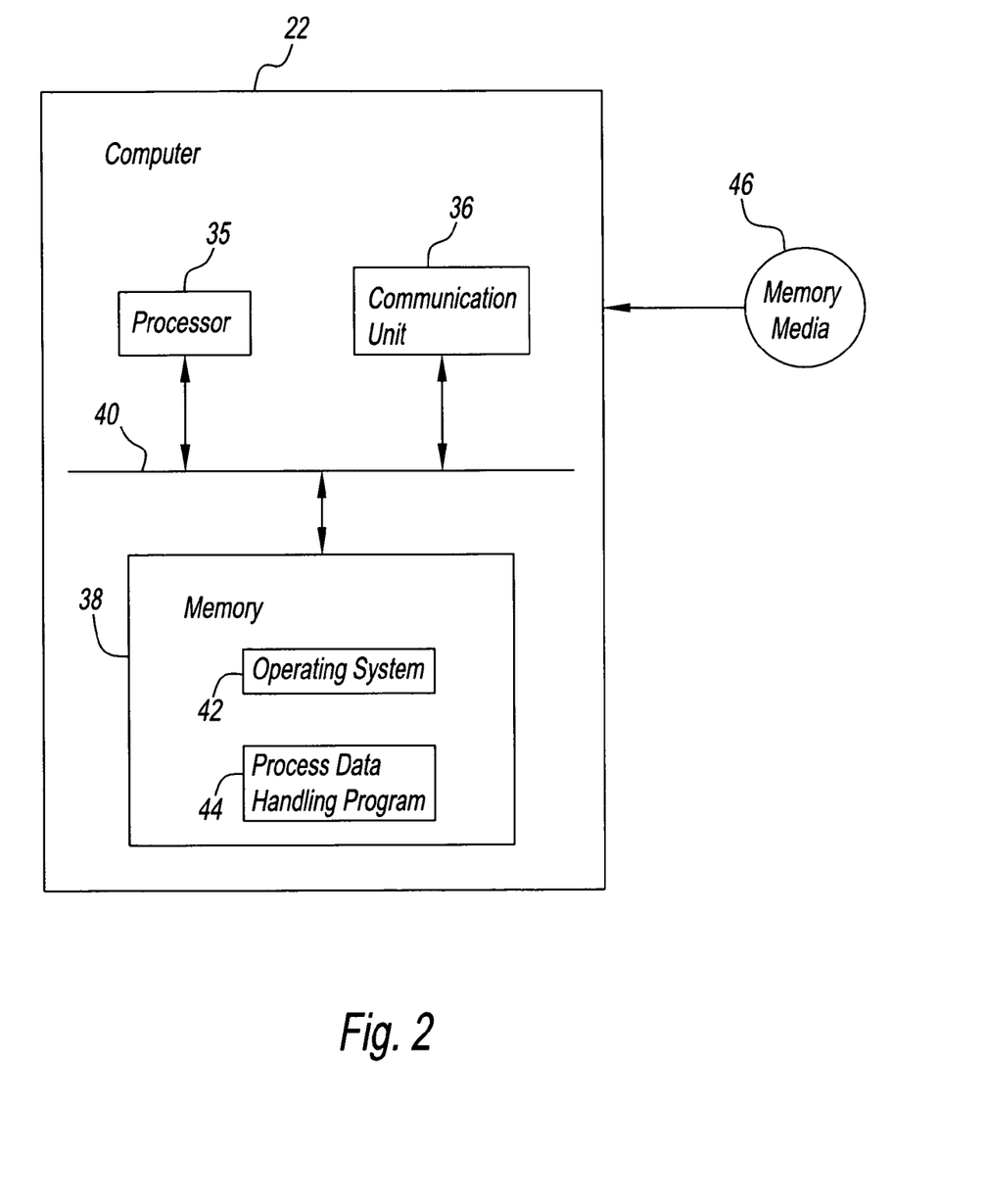
FIG. 2 is a block diagram of the computer of the FIG. 1 system.

Referring to FIG. 2, computer 22 includes a processor 35, a communications unit 36, a memory 38 and a bus 40. Bus 40 interconnects processor 35, communications unit 36 and memory 38. Memory 38 includes an operating system 42 and a process data handling program 44. Operating system 42 controls processor 35 to execute process data handling program 44 to process data of process 28 monitored by monitor 24. A memory media 46 (e.g., a disk) contains a copy of operating system 42, process data handling program 44 or other software, which can be loaded into memory 38. Communications unit 36 includes the capability to communicate via network 30.

Process data handling program 44, when run, permits a client to operate client device 32 to identify process 28 in terms of events, time variable parameters and activities. An event is something that happens at a specific time, for example, the triggering of an alarm. Time series data is continuous data of a time variable parameter, such as temperature, pressure, flow rate and the like. An activity is a time interval of the process, for example, the operation of a pump during the process.

Process data handling program 44, when run, identifies event data and activity data and classifies it according to a generic data structure for storage and retrieval based on the identified event or activity and/or attributes thereof.

For the purpose of describing the apparatus and method of the invention, an exemplary process that unloads a material, such as oil, from a ship will be initially described. It is understood, of course, that the system and method of the invention can be used with any process that has events, time variable parameters and/or activities.

Figure 3:
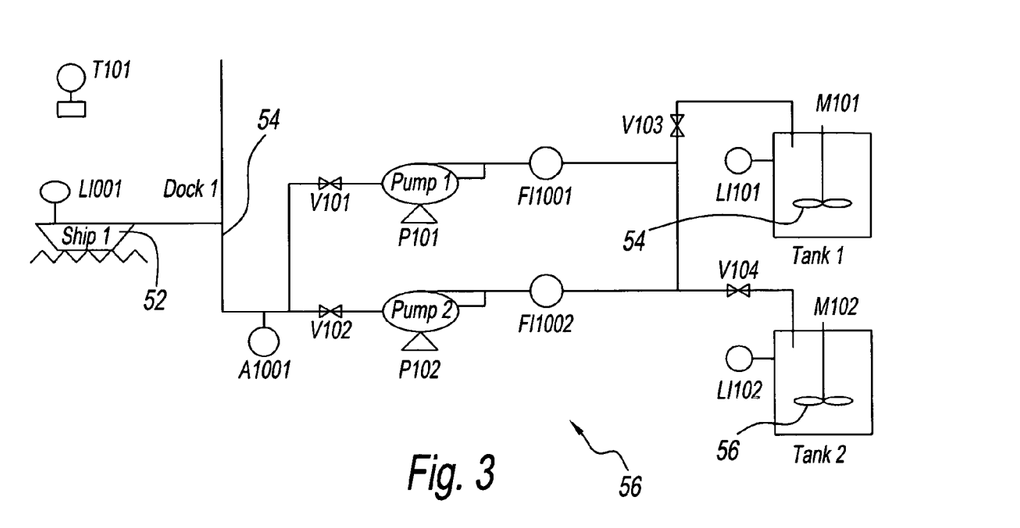
FIG. 3 depicts an exemplary process, its events, time series data and activities.

Referring to FIG. 3, a system 50 is shown for running process 28 for pumping out material from a ship 52 into a pair of holding tanks, Tank 1 and Tank 2. Ship 52 has a level indicator L1001 that monitors the material level in ship 52 during pump out process 28. A temperature monitor T101 monitors the outside ambient temperature as it can affect pumping performance. Material is pumped from ship 52 through pipes 54 and passes by a density analyzer A1001. The material is pumped to Tank 1 and Tank 2 by a pair of pumps, P101 and P102. When a valve V101 is open, the material is pumped by pump P101. When a valve V102 is open, the material is pumped by pump P102. A valve V103 controls the flow of material to Tank 1 and a valve V104 controls the flow of material to Tank 2. Flow rate to tanks using pump P101 is monitored and controlled a flow analyzer FI1001. Flow rate to tanks using pump P102 is monitored and controlled by a flow analyzer FI1002. A level indicator LI101 monitors the level of material in Tank 1 and a level indicator LI102 monitors the level of material in Tank 2. A motor M101 controls an agitator 54 in Tank 1 and a motor M102 controls an agitator 56 in Tank 2.

In system 50, the following constraints apply:
a. Contents of ship 52 do not fit into a single tank.
b. Only one tank can be filled at a time.
c. Only one pump can be used at a time.

Figure 4:
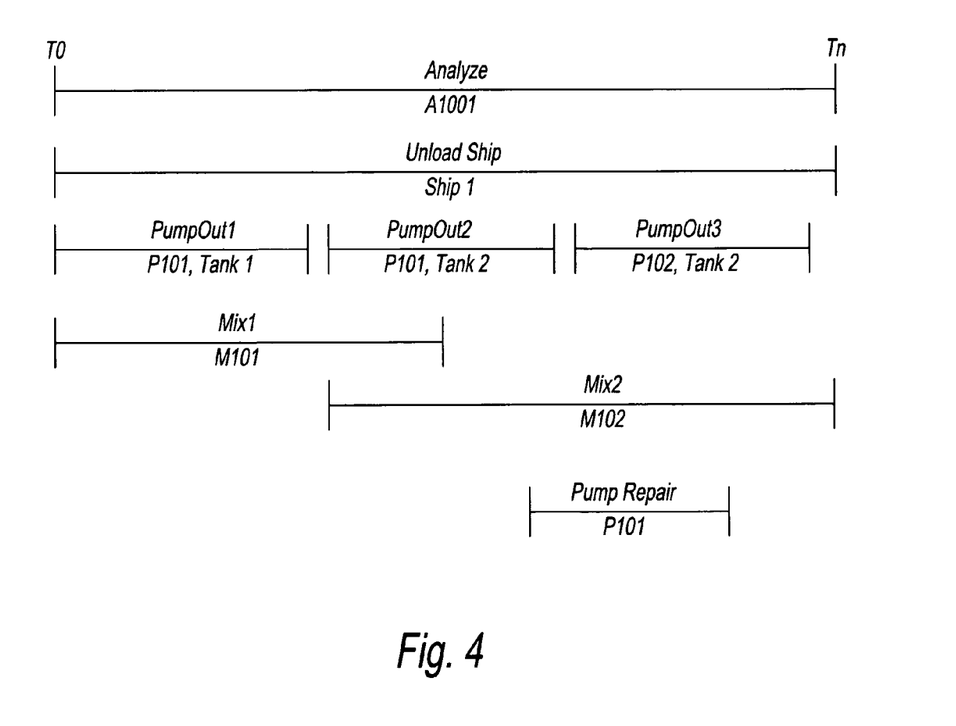
FIG. 4 depicts an activity diagram for the FIG. 3 process.

Referring to FIG. 4, a number of activities are defined for the pump out process of ship 52. The execution of the activities begins at a time T0 and completes at a time Tn. These activities are as follows:

1) Analyze activity—This activity continuously monitors analyzer A1001 throughout the pump out process from time T0 to time Tn and alerts an operator if the material density is outside of a specified range.

2) Unload Ship activity—This activity is a procedure for initiating and monitoring the pump out of ship 52. It is the master procedure responsible for initiating sub activities: Pumpout1, Pumpout2, Pumpout3, Mix1, and Mix2.

3) Pumpout1, Pumpout2, Pumpout3 activities—These three pump out activities are of the same type, but each uses different settings. A pump out activity stops when a tank is full or a failure (e.g. pump failure) occurs. In such case, the higher-level activity Unload Ship is responsible to schedule another pump out activity with the appropriate settings until ship 52 is empty. Activity Pumpout1 moves material from ship 52 to Tank 1.

Activity Pumpout1 stops when Tank 1 is full. Activity Pumpout2 pumps material from ship 52 to Tank 2. Activity Pumpout2 stops when pump P101 fails. Activity Pumpout3 uses pump P102 and continues pumping material to Tank 2 until ship 52 is empty.

4) Mix 1 activity—This activity is a procedure responsible for activating agitator 54 for Tank 1. Agitator 54 starts during activity Pumpout1 and runs for a period of time after the completion of activity Pumpout1.

5) Mix 2 activity—This activity is a procedure responsible for activating agitator 56 for Tank 2. Agitator 56 starts during activity Pumpout2, continues during activity Pumpout3 and runs for a period of time after the completion of activity Pumpout2.

These activities can be expressed in a hierarchical order of activity, sub-activity and sub-sub-activity as shown in Table 1.

TABLE 1

| Activity | Unload Ship |
|---|---|
| Sub-activity | Pumpout1 |
| Sub-sub-activity | Mix1 |
| Sub-activity | Pumpout2 |
| Sub-sub-activity | Mix2 |
| Sub-activity | Pumpout3 |
| Sub-sub-activity | Mix2 |

Figure 5:
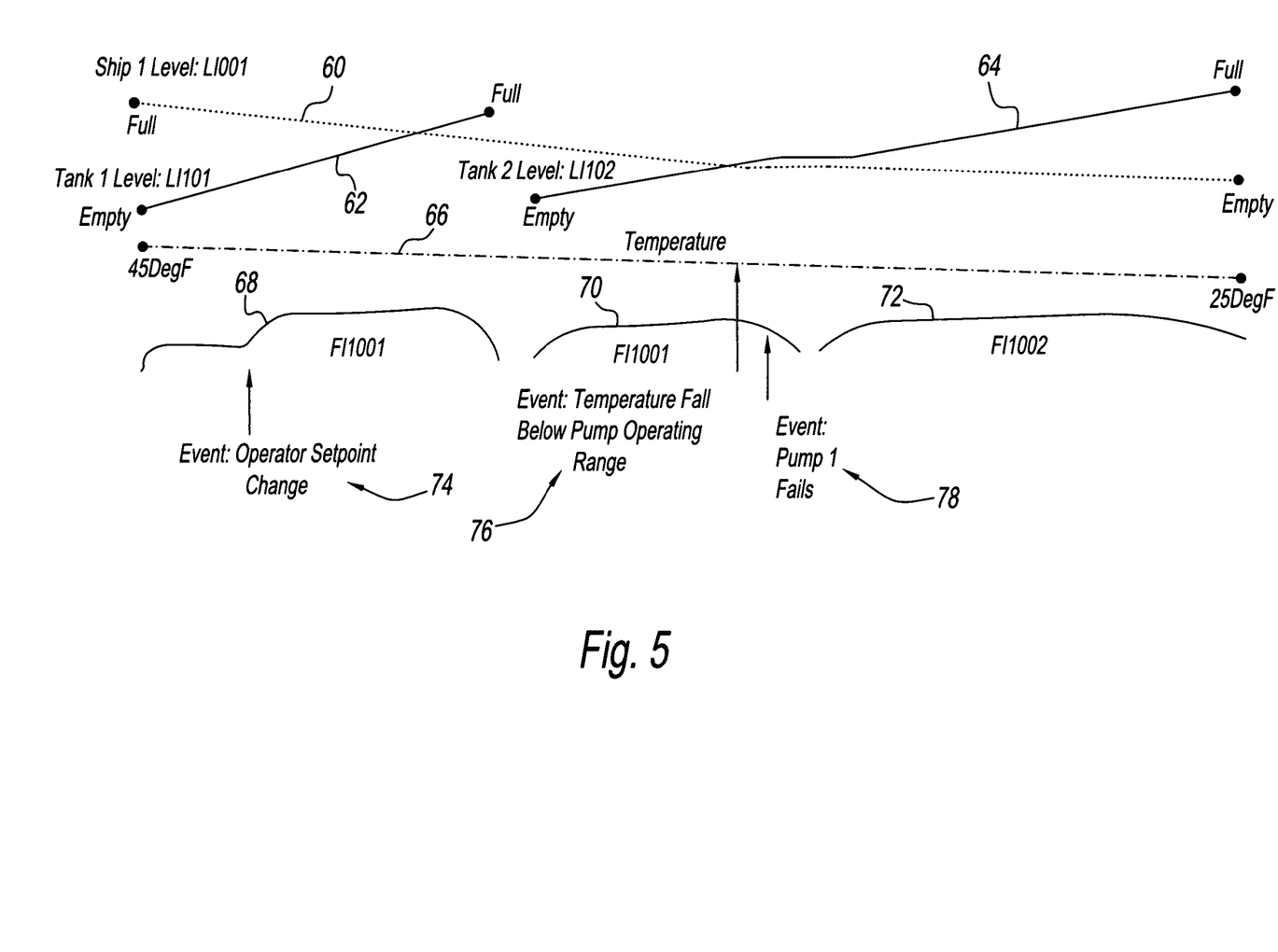
FIG. 5 depicts a data and event diagram for the FIG. 3 process.

Referring to FIG. 5, a curve 60 represents the material level in ship 52 (i.e., the values of level sensor L1001) during the activity Unload Ship. Curve 62 represents the material level in Tank 1 (i.e., the values of level sensor L1101) during the sub-activity Pumpout1. Curve 64 represents the material level in Tank 2 (i.e., the values of level sensor L1102) during sub-activity Pumpout2 and sub-activity Pumpout3. A curve 66 represents the ambient temperature (i.e., the values of temperature sensor T101) during the activity Unload ship. A curve 68 represents the flow rate of material as monitored by flow rate sensor FI1001 during sub-activity Pumpout1. A curve 70 represents the flow rate of material as monitored by flow rate sensor FI1001 during sub-activity Pumpout2. A curve 72 represents the flow rate of material as monitored by flow rate sensor FI1002 during sub-activity Pumpout3. As can be seen, the outputs of level sensors LI001, LI101 and LI102 and of flow rate sensors FI1001 and FI1002 vary with time and are continuous or time series data.

FIGS. 3-5 show the execution of the activities and sub-activities required to pump out ship 52 over a period of time. At time T0, an instance of activity Unload ship is created. The operator would give the instance a name, for example, UNLOAD_2001_06_01. The operator would then initiate the activities in either an automated or manual manner.

The process data shows a plurality of events 74, 75, 76, 77, 78 and 79 that occur during the pump out process. Event 74 represents a flow change initiated by the operator to increase the flow rate during sub-activity Pumpout1. This flow rate change is monitored by sensor FI1001. Event 76 represents a temperature alarm detected when the ambient air temperature drops below a safe pump operating range during sub-activity Pumpout2. Event 78 represents a failure of pump P101 during sub-activity Pumpout2. Event 75 represents a failure off of pump P101 at the end of activity PumpOut2. Event 79 represents a red tag out of service at the start of the pump 1 repair activity. Event 77 represents a red tag in service at the end of the pump 1 repair activity. As a result of the failure of pump P101, the process switches to the second pump P102.

Process 28 is initially defined according to a generic data structure that has a data framework for activities and events and attributes of each. The data structure is generic in that it is useable for a plurality of different processes, so that a totally new custom design for each process is unnecessary.

Process data handling program 44 identifies activities and attributes of each for process 28. The identification step is performed in response to an interactive session with a user operating client device 32. Alternatively, events and activities may be identified by process data handling program 44 as data from process 28 is gathered.

Figure 6:
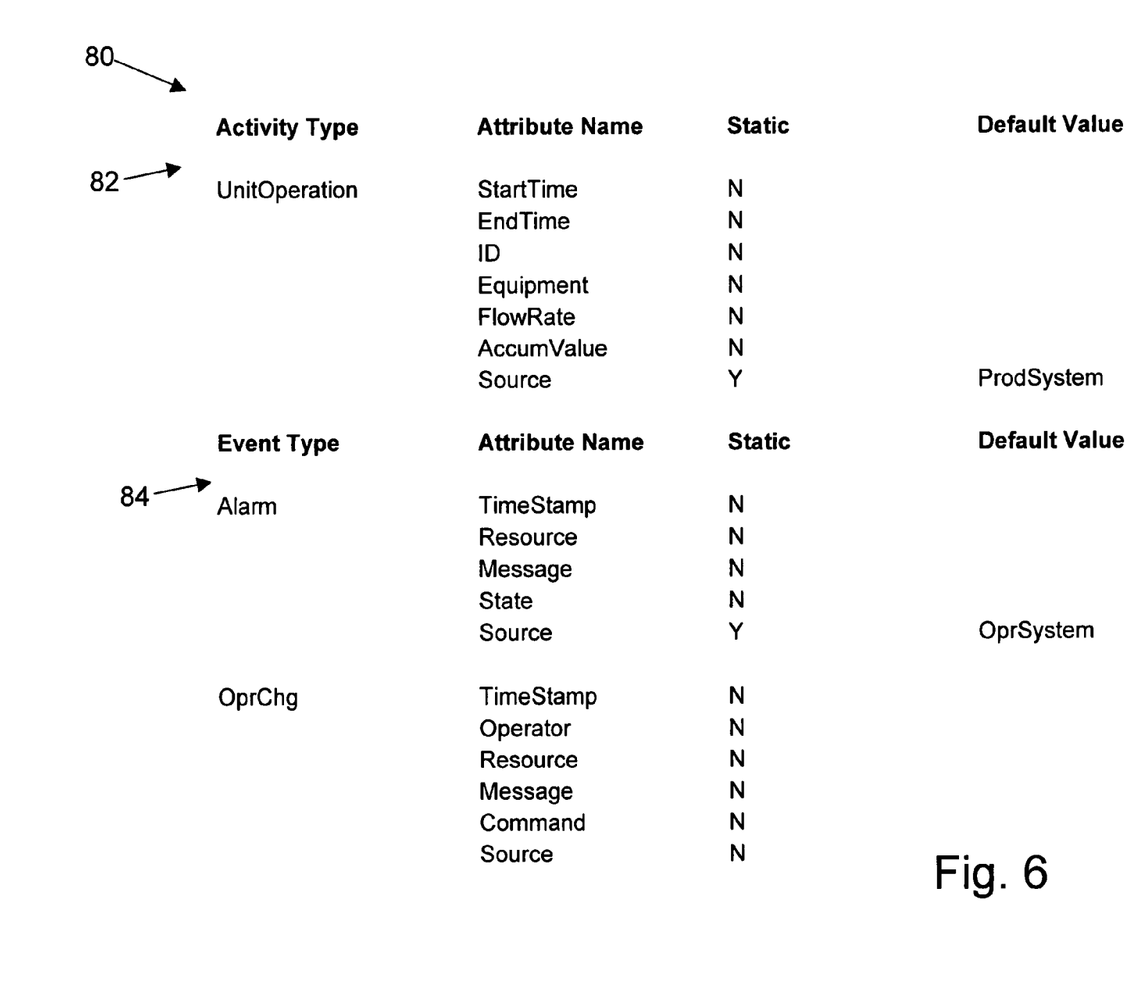
FIG. 6 depicts a data structure for the process data handling program of the FIG. 2 computer.

Referring to FIG. 6, a data structure 80 includes a framework 82 for activities and a framework 84 for events. Framework 82 defines an activity by type, attributes and characteristics of the attributes, as shown in boldface type. Framework 84 defines an event by type, attributes and characteristics of the attributes, as shown in boldface type. The characteristics of frameworks 82 and 84, e.g., define whether the attribute is static or dynamic (variable) or whether the attribute has a default value. It will be apparent to those skilled in the art that frameworks 82 and 84 may include other characteristics.

Process data handling program 44 classifies the events and activities of process 28 and their attributes identified by the identification step according to frameworks 82 and 84 of data structure 80. Thus, the unit operation activity type, the alarm event type and the operator change event type are shown in FIG. 6 as classified within data frameworks 82 and 84. The unit operation activity type has defined attributes of start time, end time, identification (ID), equipment, flow rate, accumulated value (AccumValue) and source. The alarm event type has defined attributes of time stamp, resource, message, state and source. The operator change event type has defined attributes of time stamp, operator, resource, message, command and source.

Figure 7:
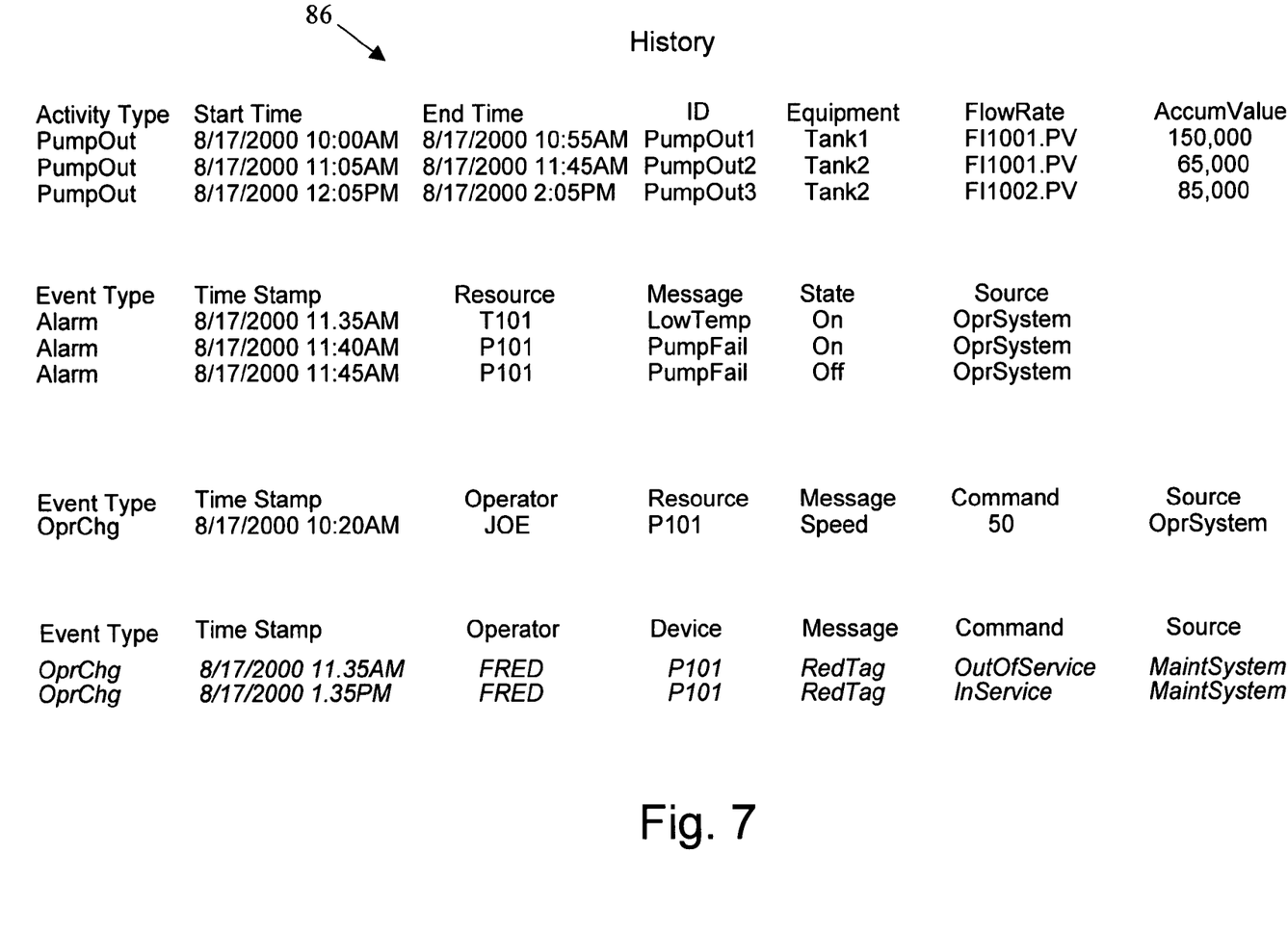
FIG. 7 depicts a partial data history of the process of FIG. 3.

Referring to FIG. 7, a history 86 of the data of process 28 is shown for three PumpOut activities, three alarm events and three operator change events. The PumpOut activities are PumpOut1, PumpOut2 and PumpOut3. For example, the data history for activity PumpOut1 has a start time of 8/17/200 at 10:00AM, and end time of Aug. 17, 2000 at 10:55AM and an equipment of Tank1.

There is one alarm event for temperature sensor T101 and two alarm events for pump P101. For example, the alarm event for temperature sensor T101 has a time stamp of Aug. 17, 2000 at 11:35AM, a message of low temperature and a state of ON.

There is one operator change event for a resource, pump P101 that has a time stamp of Aug. 17, 2000 at 10:20AM, a message of Speed and an operator named Joe. There are also two operator change events for a device, PMP101. Process 28 includes various systems that use diverse external names, e.g., device or resource, for the same field or attribute name. Also, the diverse systems may also use different field contents for the same operational mechanism. In this case, pump P101 and pump PMP101 are the same pump.

Process data handling program 44 includes a global dictionary or map structure that is used to map or transform (1) external field names, such as resource and device, to an internal field name or attribute of resource and (2) external field contents, such as P101 and PMP101, to internal attribute fields of P101.

Figure 8:
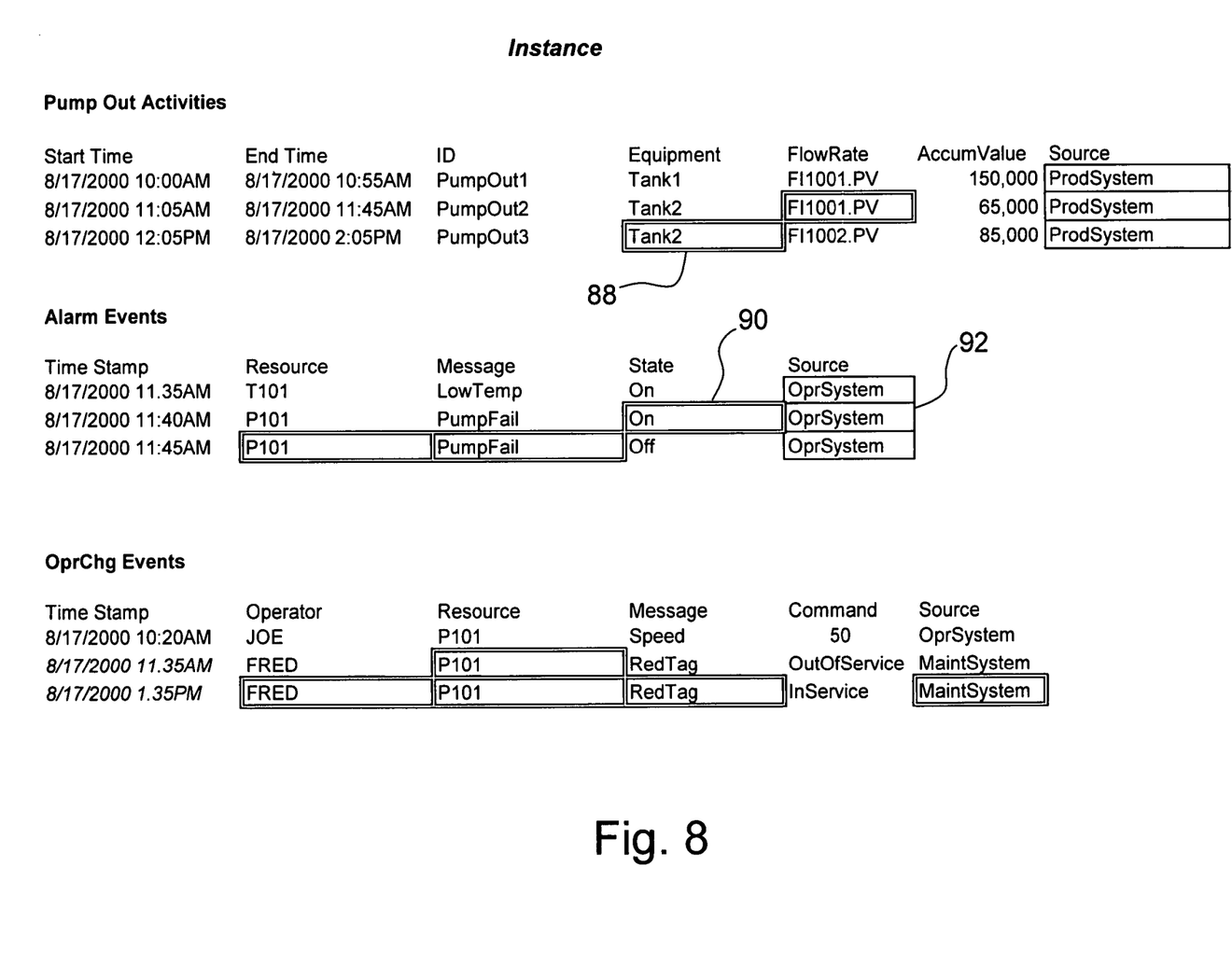
FIG. 8 depicts instances of activities and events.

Referring to FIGS. 6 and 8, process data handling program 44 organizes storage of event and activity data by event type and activity type and by attribute thereof. Thus, the data for all of the PumpOut activities, the alarm events and the operator change events is stored by attribute. For example, the start times of PumpOut1, PumpOut2 and PumpOut3 are all stored in one logical or physical storage volume and the end times thereof are stored in another logical or physical storage volume. Thus, process data handling program 44 converts a request to store or retrieve a start time for activity PumpOut1 to a form that accesses memory 38 for the storage volume that is allocated for the start times of the PumpOut activities, specifically the location therein for the start time of activity Pumpout1.

In a preferred embodiment of the invention, storage is optimized by using compression. If a current value is identical to the last stored value of an attribute type, then the current value does not need to be stored. This is called equality compression. The double border boxes in FIG. 8 show some current values that need not be stored. For example, box 88 shows a current value of Tank2, which is a repeat of the last stored value of the equipment attribute type of the Pump Out activities. As another example, box 90 shows a current value of ON, which is a repeat of the last stored value of the state attribute type of alarm events.

If a value of an attribute type always has the same value for a specific event and/or activity type, optimization is achieved by defining it as a static attribute and the storing the attribute value as a part of the event and/or activity type definition. For example, boxes 92 in FIG. 8 show a static attribute value of operating system. These values need not be stored.

These optimization rules or policy can be summarized as follows:
1. Store each attribute in a particular storage volume.
2. Do not store an attribute value if it is identical to the preceding value in the storage volume.
3. When retrieving the attribute, use the value for the timestamp of the event (or activity) or the preceding value.

Figure 9:
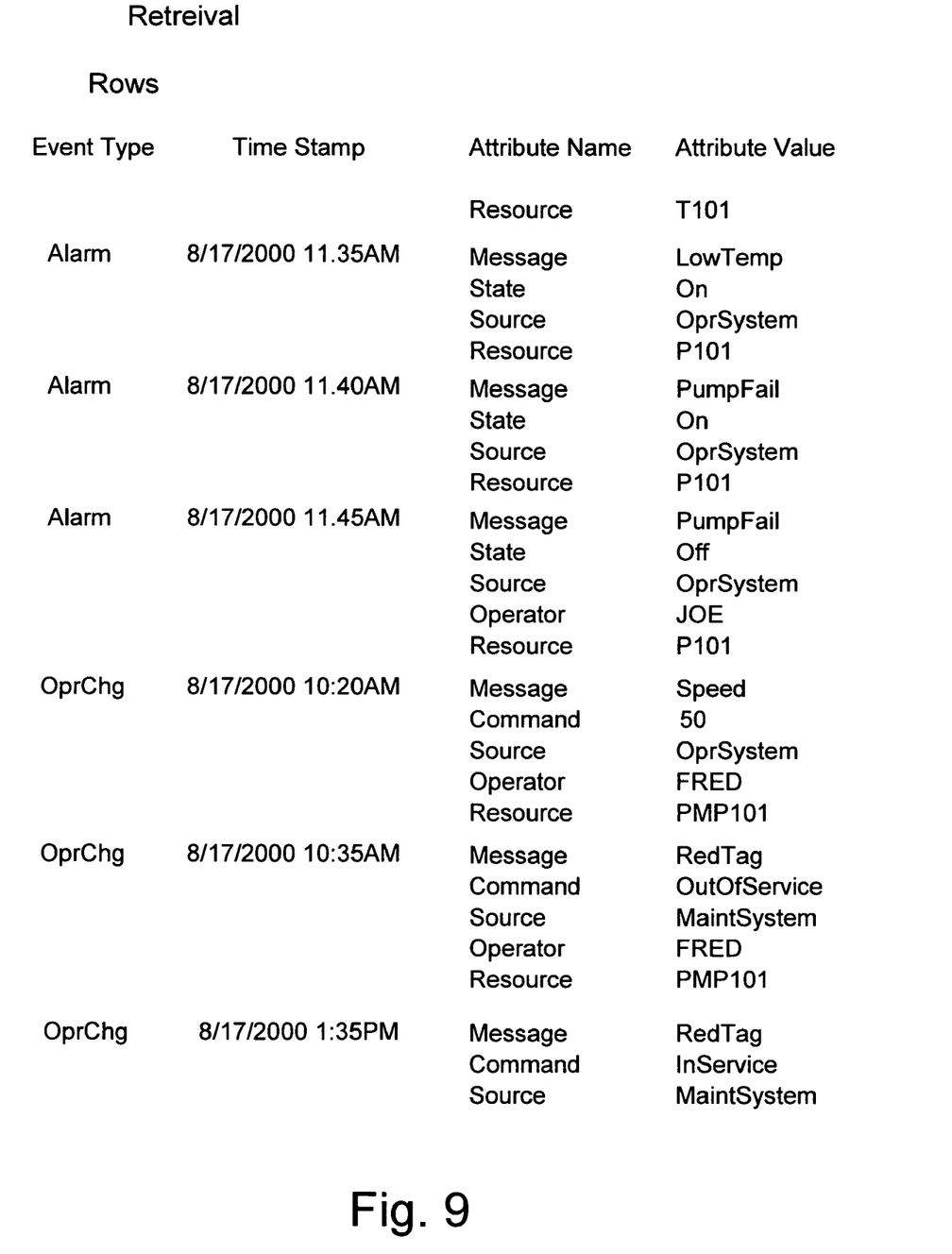
FIGS. 9-11 depict different presentation formats of the process data.
Figure 10:
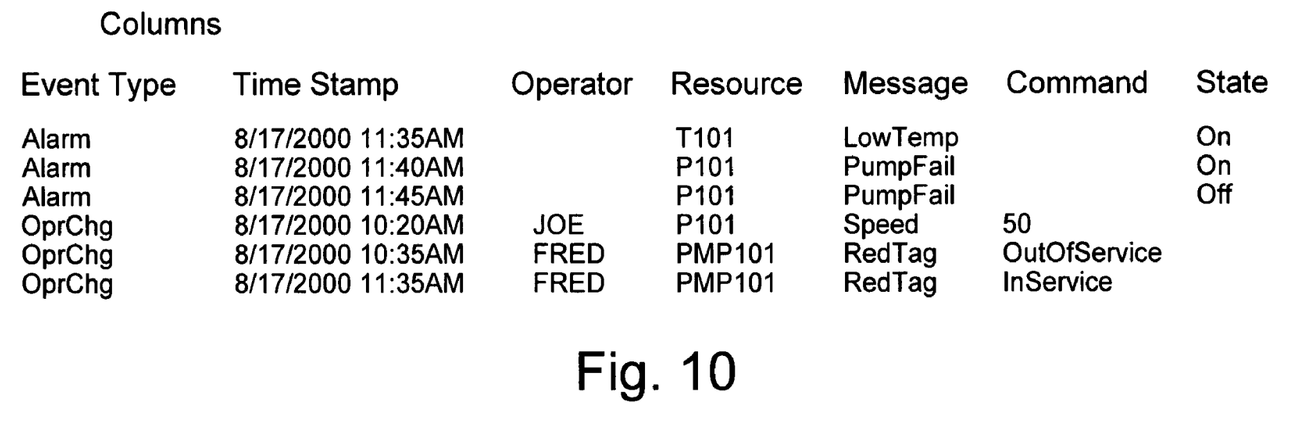
Figure 11:
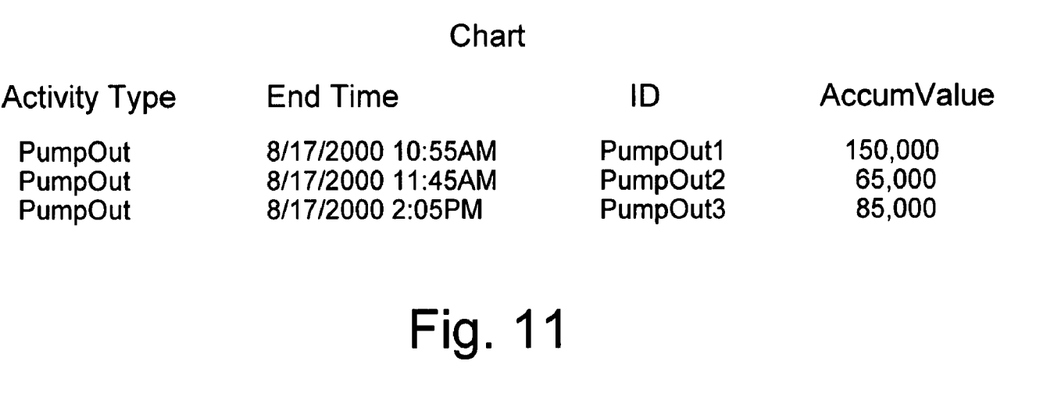

Referring to FIGS. 9-11, data of different event and/or activity types can be retrieved and presented in any one of a plurality of formats. In FIG. 9, the data is presented in a row format in which the attributes of an event (or activity) are presented in a row. This format is useful for generic reports. In FIG. 10, the data is presented in a column format in which the event (or activity) types are presented in rows and the attribute values are presented in columns. This format is useful when looking for specific event or activity types. In FIG. 11, the data is presented in a time series format in which the value for a particular event (or activity) is taken for a number of events (or activities). This format is extremely useful for generating graphical views.

Figure 12:
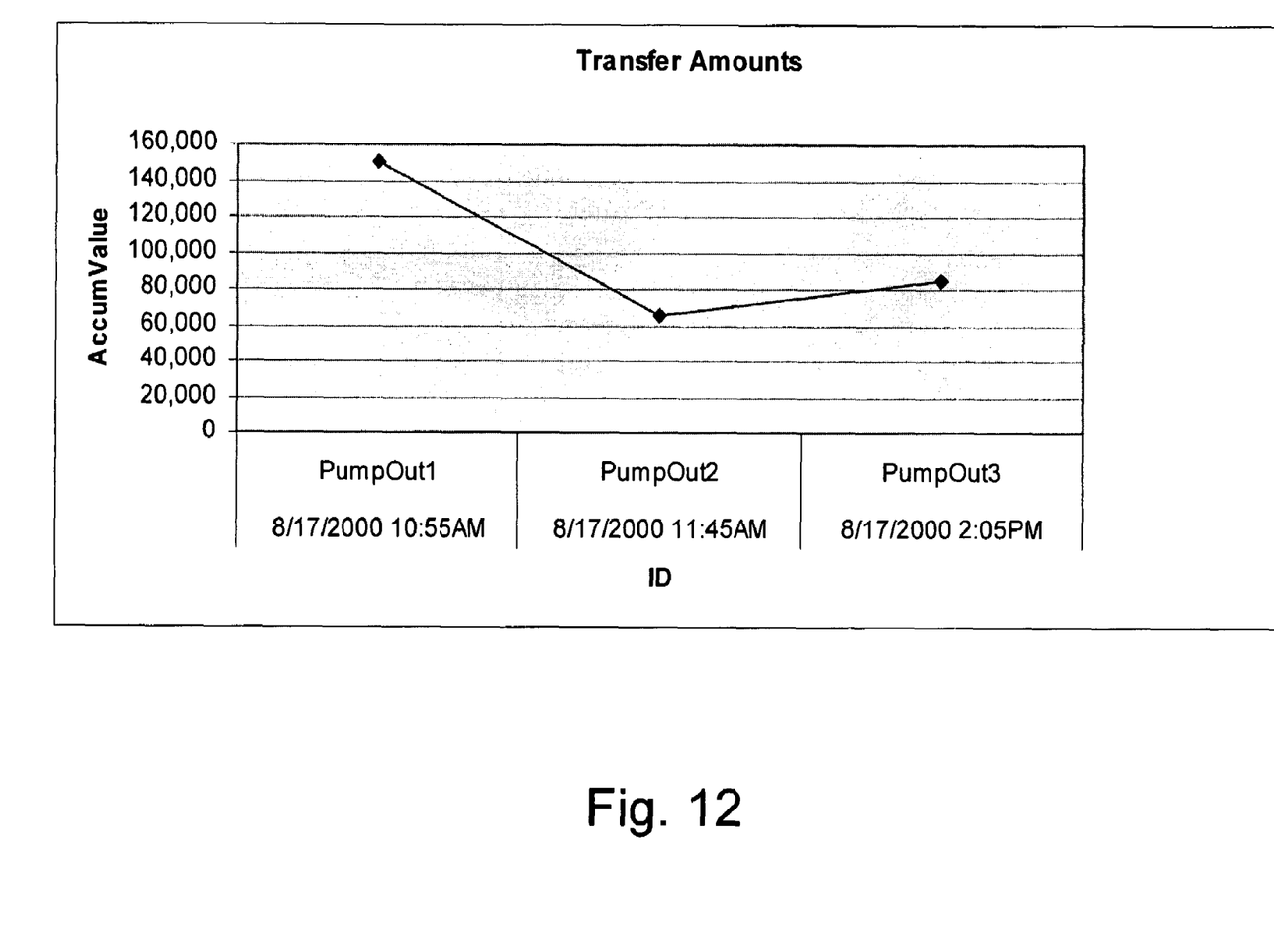
FIG. 12 is a graph of the FIG. 11 data presentation.

Referring to FIG. 12, the accumulated values of the FIG. 11 presentation are plotted against the PumpOut end times.

Figure 13:
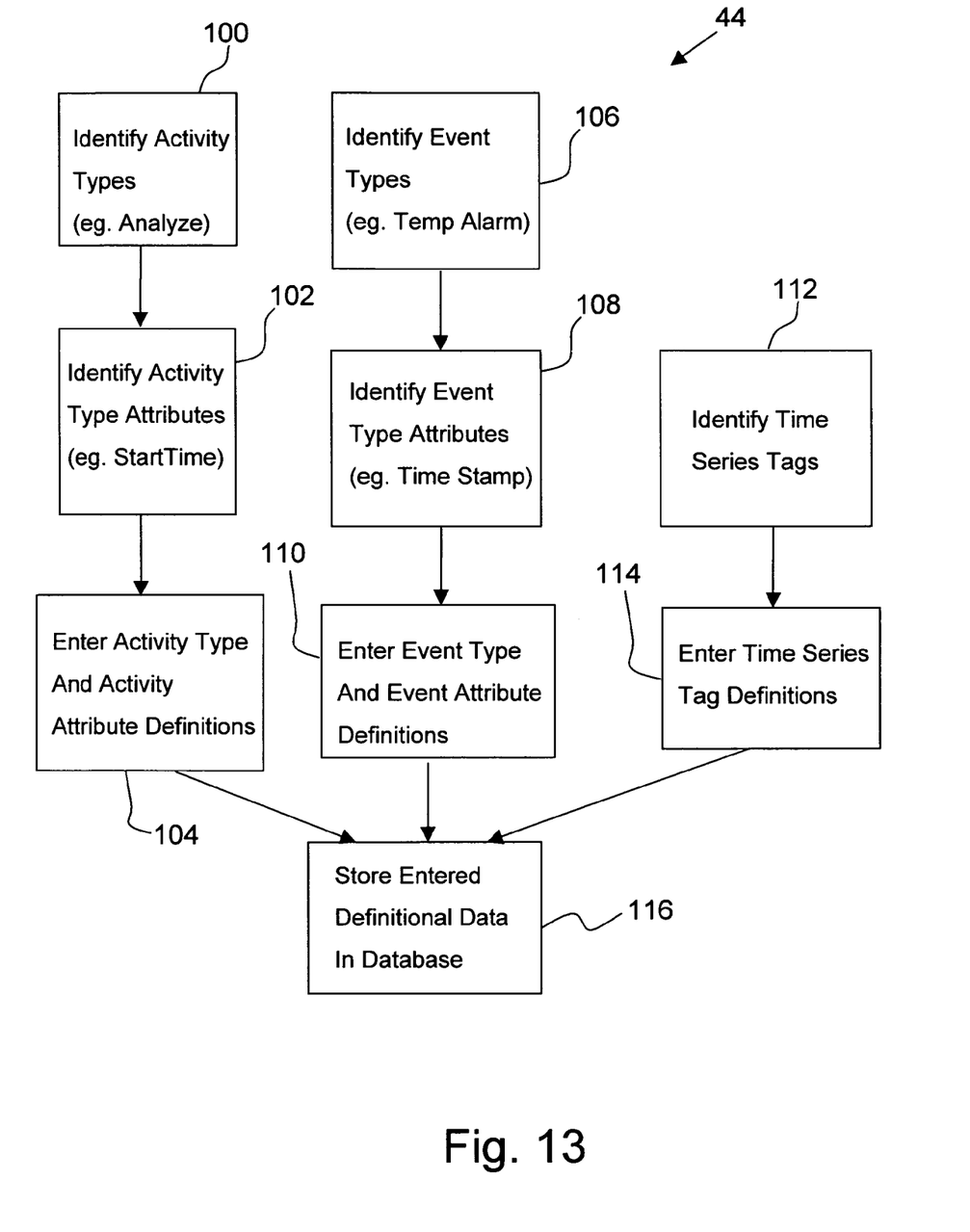
FIGS. 13 and 14 are flow diagrams of the process data handling program of the computer of FIG. 2.

Referring to FIG. 13, process data handling program 44 permits a user to define a process in terms of data structure 80. Step 100 identifies the activities, sub-activities, sub-sub-activities and so on of the process. Step 102 identifies activity type attributes, such as start times and end times, time variable parameters (e.g., flow rate), equipment and tags. Step 104 classifies the activities defined by step 100 and the attributes defined by step 102 according to data structure 80. Step 104 also interprets these activities and attributes to build the global dictionary maps required to map diverse (but equivalent) external names and field contents to a common internal field name and field content.

Step 106 identifies event types. Step 108 identifies event type attributes. Step 110 classifies event types defined by step 106 and the attributes defined by step 108 according to data structure 80. Step 110 also interprets these events and attributes to build the global dictionary maps required to map diverse (but equivalent) external names and field contents to a common internal field name and field content. Step 112 identifies tags for sensors that monitor time series data. Step 114 accepts the tags defined by step 112. Step 116 stores the definitional data accepted by steps 104, 110 and 114 in data base 26 in a manner that permits access by activity, event, attributes of either and/or tags. For example, database 26 may be physically or logically organized by activity, event and attributes of either. If logically organized, a storage access translator would be used to translate the activity, event, attributes of either and/or tag access data into physical storage volumes.

Figure 14:
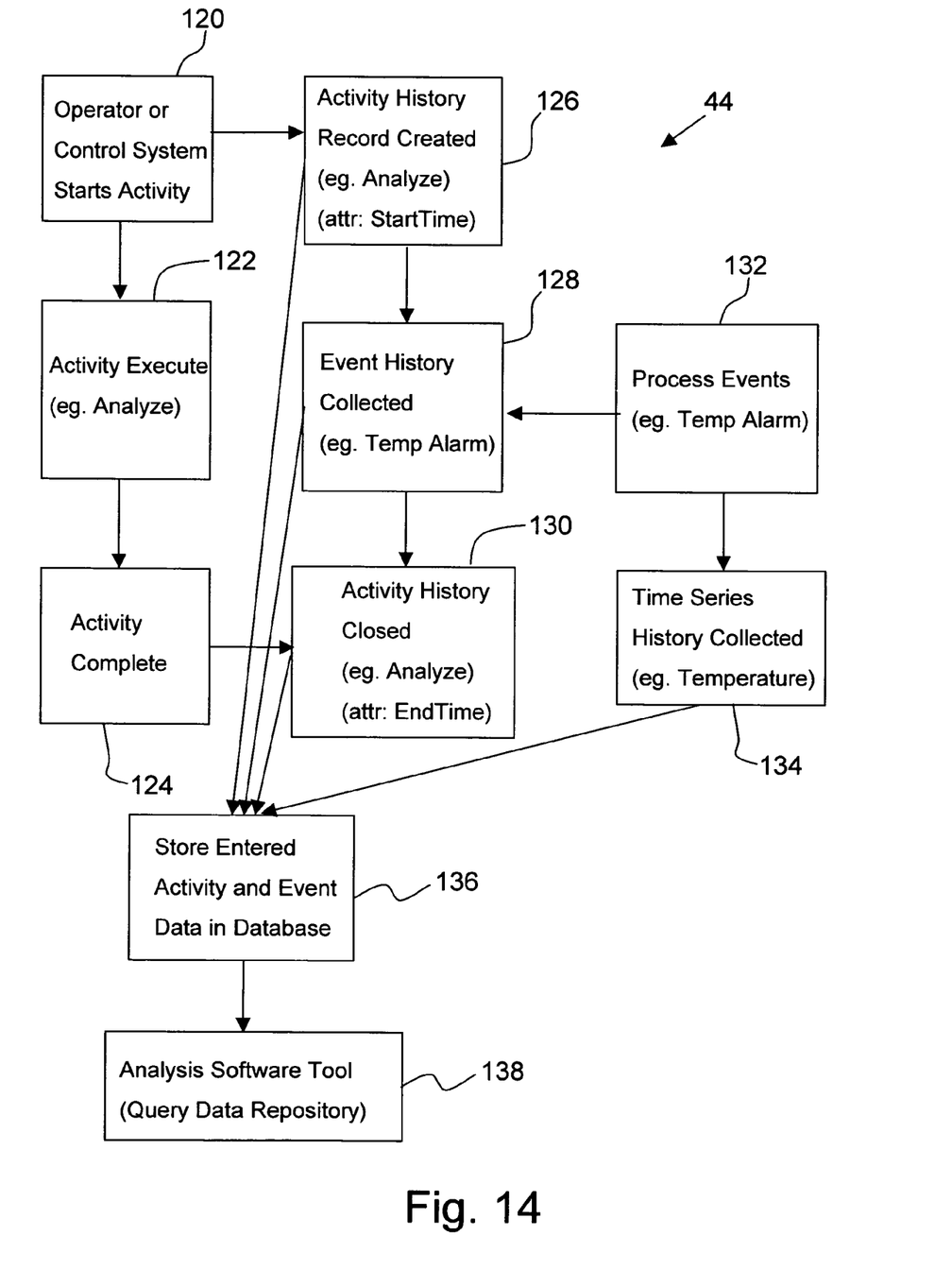

Referring to FIG. 14, process data handling program 44 also permits the collection of data during the running of the process, such as process 28. Step 120 identifies that the process has been initiated by the operator or automatically by a control system. Step 122 executes activities, such as Pumpout1. Step 124 determines when step 122 is finished. Step 130 closes the collection of activity data.

Step 126 creates an activity history record, such as attribute values (e.g., start time). Step 128 collects event happenings, time stamps and the like for events. Step 130 closes an activity history record, such as attribute values (end time). Step 132 processes the event happenings and links them to activities of any tier. Step 134 collects time series data monitored by the various sensors of the process.

Step 136 stores the activity, event and time series data in database 26 for retrieval by activity, attribute thereof and/or tag. Step 138 retrieves the data activity, event, attribute and/or sensor tag for processing or analysis.

The present invention having been thus described with particular reference to the preferred forms thereof, it will be obvious that various changes and modifications may be made therein without departing from the spirit and scope of the present invention as defined in the appended claims.

What is claimed is:

1. A method for using a computer to define, store and retrieve data of an industrial process, said method comprising:
   collecting with a monitor said data of said industrial process and providing said data of said industrial process to said computer;
   operating said computer with a program to define said industrial process by
      identifying, in response to input data entered by a user, one or more events and/or activities of said industrial process and one or more attributes of said events and/or said activities;
      classifying said identified events, activities and attributes according to a data structure that comprises at least a first event type or at least a first activity type and a plurality of attribute types therefore; and
      organizing a plurality of storage volumes of a database for said classified attribute types, wherein said plurality of storage volumes comprises first and second storage volumes that are organized by said attribute types for said first activity type or for said first event type and for storage of values of said attributes of said first and second attribute types, respectively, of said first activity type of said first event type, wherein values of first and second attributes of said first and second attribute types are stored only in said first and second volumes, respectively; and
   to store and retrieve said collected data of said industrial process when running by
      using said data structure in a manner that permits access to said organized storage volumes of said database by said activities, events and attributes that are identified by said identifying step to store said collected data of said industrial process in said storage volumes according to said data structure and, in response to a request, which identifies a first activity of said first activity type or a first event of said first event type and said first attribute type, to retrieve from said first storage volume at least one value of said first attribute type that corresponds to said first activity or said first event and, in response to a request, which identifies said first activity of said first activity type or said first event of said first event type and said second attribute type, to retrieve from said second storage volume at least value of said second attribute that corresponds to said first activity or said first event; and
      providing said retrieved values of said first and second attribute types to a client device.

2. The method of claim 1, wherein at least one of said classified attribute types is a start time, and wherein at least one of said storage volumes is accessed according to said start time type for storage and retrieval of values of said attributes corresponding to at least one of said events and/or activities.

3. The method of claim 1, wherein at least one attribute of a plurality of said events and/or activities is common to at least one of said defined attribute types, and wherein at least one storage volume of said database is allocated to all of said common attributes.

4. The method of claim 1, further comprising compressing said data of said industrial process which is stored in a first one of said storage volumes according to identity of values of said data of said industrial process of said attributes of consecutive events and/or activities that have been allocated for storage in said first one of said storage volumes.

5. The method of claim 4, wherein said data structure further comprises a time stamp, and wherein said first one of said storage volumes is accessed according to said time stamp for storage and/or retrieval of said values of said data of said industrial process, and wherein said values of said data of said industrial process of a first event are retrieved from said first storage volume by using a value of a first time stamp for said first event or of a second time stamp value of a second one of said events that is earlier in time than said first time stamp value.

6. The method of claim 1, wherein a value of an attribute type that is always the same for a specific one of said event or activity types is classified as static, and further comprising optimizing data storage in one of said storage volumes by omitting storage of said static value.

7. The method of claim 1, wherein said industrial process is one of a plurality of industrial processes, and wherein said program operates said computer for each of said plurality of industrial processes using said data structure.

8. The method of claim 7, wherein at least two of said plurality of industrial processes are different from one another.

9. The method of claim 1, further comprising presenting data values of different ones of said events and/or activities that are defined as different event and/or activity types in any one of a plurality of formats to said client device.

10. The method of claim 9, wherein said plurality of formats are selected from the group consisting of: row format, column format and chart format.

11. The method of claim 1, further comprising developing a map structure for mapping diverse external names of said attributes and/or field contents thereof to a common internal attribute name and/or field content.

12. The method of claim 1, wherein a portion of said data of said industrial process is continuous data of a time variable parameter, and wherein said monitor comprises at least one sensor that receives said continuous data and provides it to said computer.

13. A computer system that defines, stores and retrieves the data of an industrial process comprising:
a computer, a database, a client device and a monitor that collects said data of said industrial process and provides said data of said industrial process to said computer, wherein said computer comprises a program that when executed on said computer performs the steps comprising:
defining said industrial process by
identifying, in response to input data entered by a user, one or more events and/or activities of said industrial process and one or more attributes of said events and/or activities;
classifying said events, activities and attributes that are identified by step (a) according to a data structure that comprises at least a first event type or at least a first activity type and a plurality of attribute types therefore; and
organizing a plurality of storage volumes of a database for said classified attribute types, wherein said plurality of storage volumes comprises first and second storage volumes that are organized by said attribute types for said first activity type or for said first event type and for storage of values of said attributes of said first and second attribute types, respectively, of said first activity type or of said first event type, wherein values of first and second attributes of said first and second attribute types are stored only in said first and second volumes, respectively; and
storing and retrieving said collected data of said industrial process when running by
using said data structure in a manner that permits access to said organized storage volumes of said database by said activities, events and attributes that are identified by said identifying step to store said data of said industrial process in said storage volumes according to said data structure and, in response to a request, which identifies a first activity of said first activity type or a first event of said first event type and said first attribute type, to retrieve from said first storage volume at least one value of said first attribute type that corresponds to said first activity and, in response to a request, which identifies said first activity type or said first event type and said second attribute type, to retrieve from said second storage volume at least one value of said second attribute type that corresponds to said first activity; and
providing said retrieved values of said first and second attributes to a client device.

14. The computer system of claim 13, wherein at least one of said classified attribute types is a start time, and wherein at least one of said volumes is accessed according to said start time type for storage and retrieval of values of said attributes corresponding to at least one of said events and/or activities.

15. The computer system of claim 13, wherein at least one attribute of a plurality of said events and/or activities is common to at least one of said defined attribute types, and wherein at least one storage volume of said database is allocated to all of said common attributes.

16. The computer system of claim 13, further comprising compressing said data of said industrial process which is stored in a first one of said storage volumes according to identity of values of said attributes of consecutive events and/or activities that have been allocated for storage in said first one of said storage volumes.

17. The computer system of claim 16, wherein said data structure further comprises a time stamp, and wherein said first one of said storage volumes is accessed according to said time stamp for storage and/or retrieval of said values, and wherein said values of a first event are retrieved from said first storage volume by using the value of a first time stamp for said first event or of a second time stamp value of a second one of said events that is earlier in time than said first time stamp value.

18. The computer system of claim 13, wherein a value of an attribute type that is always the same for a specific one of said event or activity types is classified as static, and further comprising optimizing data storage in said first one of said storage volumes by omitting storage of said static value.

19. The computer system of claim 13, wherein said industrial process is one of a plurality of industrial processes, and wherein each of said plurality of industrial processes is classified for defined event and/or activity types and defined attribute types using said data structure.

20. The computer system of claim 19, wherein at least two of said plurality of industrial processes are different from one another.

21. The computer system of claim 13, wherein said program further presents data values of different ones of said event and/or activities that are defined as different event and/or activity types in any one of a plurality of formats to said client device.

22. The computer system of claim 21, wherein said plurality of formats is selected from the group consisting of: row format, column format and chart format.

23. The computer system of claim 13, wherein said program further develops a map structure for mapping diverse external names of attributes and/or field contents thereof to a common internal attribute name and/or field content.

24. The computer system of claim 13, wherein a portion of said data of said industrial process is continuous data of a time variable parameter, and wherein said monitor comprises at least one sensor that receives said continuous data and provides it to said computer.

25. A memory media having stored thereon a computer readable program for controlling a computer that defines, stores and retrieves data of an industrial process, wherein said computer readable program comprises:

defining said industrial process by executing
one or more first program instructions that control said computer to identify, in response to input data entered by a user one or more events and/or activities of said industrial process and one or more attributes of said events and/or activities;
one or more second program instructions that control said computer to classify said identified events, activities and attributes that are identified by said computer per the first program instructions according to a data structure that comprises at least a first event type or at least a first activity type and a plurality of attribute types therefore; and
one or more third program instructions that control said computer to organize a plurality of storage volumes of a database for said classified attribute types wherein said plurality of storage volumes comprises first and second storage volumes that are organized by said attribute types for said first activity type or for said first event type and for storage of values of said attributes of said first and second attribute types, respectively, of said first activity type of said first event type, wherein values of first and second attributes of said first and second attribute types are stored only in said first and second volumes, respectively; and storing and retrieving said data of said industrial process when running by executing
one or more fourth program instructions that control said computer to use said data structure in a manner that permits access to said organized storage volumes of said database by said activities, events and attributes that are identified by said computer per the first program instructions to store said collected data of said industrial process in said storage volumes according to said data structure and, in response to a request, which identifies a first activity said first activity type or a first event of said first event type and said first attribute type, to retrieve from said first storage volume at least one values of said first attribute type that corresponds to said first activity and, in response to a request, which identifies said first activity of said first activity type or said first event of said first event type and said second attribute type to retrieve from said second storage volume at least one value of said second attribute that corresponds to said activity or said first event; and
one or more fifth program instructions that control said computer to provide said retrieved values of said first and second attributes to a client device.

26. The memory media of claim 25, wherein a portion of said data of said industrial process is continuous data of a time variable parameter, and wherein said monitor comprises at least one sensor that receives said continuous data and provides it to said computer.

* * * * *